US010084353B2

(12) United States Patent
Lee

(10) Patent No.: US 10,084,353 B2
(45) Date of Patent: Sep. 25, 2018

(54) ROTOR AND MOTOR HAVING THE SAME

(71) Applicant: LG INNOTEK CO., LTD., Seoul (KR)

(72) Inventor: Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 199 days.

(21) Appl. No.: 15/144,116

(22) Filed: May 2, 2016

(65) Prior Publication Data

US 2016/0322871 A1 Nov. 3, 2016

(30) Foreign Application Priority Data

Apr. 30, 2015 (KR) .................. 10-2015-0061433

(51) Int. Cl.
*H02K 1/28* (2006.01)
*H02K 1/24* (2006.01)
*H02K 3/18* (2006.01)
*H02K 19/02* (2006.01)

(52) U.S. Cl.
CPC .............. *H02K 1/24* (2013.01); *H02K 3/18* (2013.01); *H02K 19/02* (2013.01); *H02K 2213/12* (2013.01)

(58) Field of Classification Search
CPC ............ H02K 1/24; H02K 3/18; H02K 19/02
See application file for complete search history.

(56) References Cited

U.S. PATENT DOCUMENTS

| 6,787,966 B2 * | 9/2004 | Haga ..................... H02K 1/24 29/732 |
| 2002/0121831 A1 | 9/2002 | Egawa et al. |
| 2004/0124737 A1 | 7/2004 | Yamamoto et al. |
| 2005/0206264 A1 * | 9/2005 | Yamamoto ............ H01R 39/32 310/216.001 |

FOREIGN PATENT DOCUMENTS

WO    WO-02058210 A1    7/2002

OTHER PUBLICATIONS

Extended European Search Report dated Sep. 2, 2016 in European Application No. 16165200.3.

* cited by examiner

*Primary Examiner* — Dang Le
(74) *Attorney, Agent, or Firm* — Saliwanchik, Lloyd & Eisenschenk

(57) ABSTRACT

Provided is a rotor including a first rotor body including a first protrusion protruding from an outer circumferential surface thereof and a second rotor body stacked on and coupled to the first rotor body and including a second protrusion disposed at a position different from the first protrusion with respect to a circumferential direction and protruding from an outer circumferential surface thereof, wherein a height of the first protrusion is formed to be greater than a height of the first rotor body, and a height of the second protrusion is formed to be greater than a height of the second rotor body. The rotor is formed so that coils are wound around the respective protrusions that are divided and have relatively wide winding spaces unlike a rotor integrated with protrusions around which coils are wound, thereby increasing a coil space factor and providing an effect of facilitating a winding task.

10 Claims, 13 Drawing Sheets

ROTOR AND MOTOR HAVING THE SAME

CROSS-REFERENCE TO RELATED APPLICATION

This application claims priority under 35 U.S.C. § 119 to Korean Patent Application No. 10-2015-0061433, filed Apr. 30, 2015, which is hereby incorporated by reference in its entirety.

BACKGROUND

Field of the Invention

The present invention relates to a rotor and a motor having the same, and more particularly, to a rotor around which a coil is wound and a motor having the same.

Discussion of Related Art

Generally, a vehicle includes a starter motor which drives an engine and an alternator which generates electricity using a rotational force of the engine. The starter motor has an ignition switch is connected to a power supply of a battery by an operation of a driver when the vehicle is started up, then the power is supplied to the starter motor, the engine is rotated by a driving force generated by the starter motor, and thus the vehicle is started up.

In comparison, the alternator is connected to a driving unit of the engine to rotate the rotor while a magnetic field is formed by a driving force of the engine, then an alternating current (AC) power is generated, and thus the battery is charged using a rectifier or the like.

Since both of the starter motor and the alternator are configured in a stator-rotor structure, the structures of the starter motor and the alternator are very similar to each other, and can be operated as a power generator or a motor depending on whether a force or power is applied.

Recently, a belt driven starter generator (BSG) capable of functioning as a starter motor and an alternator with a single structure is actively being studied.

Meanwhile, a wound rotor synchronous motor is a motor having a protrusion which protrudes from an outer circumferential surface of a rotor core and around which a coil is wound. The wound rotor synchronous motor has not only been mainly used as a generator but also been recently proposed as a form of a traction motor since a development of a rare earth-free motor has been spotlighted.

However, the motor has to increase the number of coils or a current to increase torque. However, in the case of the BSG there is a problem in that an increase in torque of the motor is limited because there is a limit in increasing the number of winding coils due to spatial constraints and in increasing a current due to a current limit.

BRIEF SUMMARY

The present invention is directed to a rotor capable of increasing torque by increasing a space factor of a coil and facilitating assembly, and a motor having the same.

An objective of the present invention is not limited to the above-mentioned objective, and other objectives of the present invention will be clearly understood by one skilled in the art from the following description.

According to an aspect of the present invention, there is provided a rotor including a first rotor body including a first protrusion protruding from an outer circumferential surface thereof and a second rotor body stacked on and coupled to the first rotor body and including a second protrusion disposed at a position different from a position of the first protrusion with respect to a circumferential direction and protruding from an outer circumferential surface thereof, wherein a height of the first protrusion is formed to be greater than a height of the first rotor body, and a height of the second protrusion is formed to be greater than a height of the second rotor body.

The first protrusion may include a first extension protruding further than a lower surface of the first rotor body, and the second protrusion may include a second extension protruding further than an upper surface of the second rotor body.

Each of the first extension and the second extension may include a slide edge part formed at an inner end thereof.

The slide edge part may include a slide protrusion protruding and disposed in a height direction, and the first rotor body and the second rotor body may include slide grooves concavely formed on the outer circumferential surfaces thereof and disposed in the height direction, respectively.

The slide edge part may include a slide groove protruding and disposed in a height direction, and the first rotor body and the second rotor body may include slide grooves concavely formed on the outer circumferential surfaces thereof and disposed in the height direction, respectively.

The slide protrusion or the slide groove may be disposed in the center of the slide edge parts with respect to the circumferential direction.

The slide protrusion may have a width reduced from an inner side toward an outer side, and the slide groove may have a width increased from an inner side toward an outer side.

The slide edge part of the first rotor body may have an inner circumferential surface corresponding to the outer circumferential surface of the second rotor body, and the slide edge part of the second rotor body may have an inner circumferential surface corresponding to the outer circumferential surface of the first rotor body.

The slide protrusion or the slide groove may be formed on the inner circumferential surface of the slide edge part.

According to another aspect of the present invention, there is provided a motor which includes a stator, a rotor including a first rotor body disposed in the stator and including a first protrusion protruding from an outer circumferential surface thereof and a second rotor body stacked on and coupled to the first rotor body and including a second protrusion disposed at a position different from a position of the first protrusion with respect to a circumferential direction and protruding from an outer circumferential surface thereof, wherein a height of the first protrusion is formed to be greater than a height of the first rotor body, and a height of the second protrusion is formed to be greater than a height of the second rotor body, a coil unit wound around each of the first protrusion and the second protrusion, and a rotating shaft coupled to the rotor.

According to still another aspect of the present invention, there is provided a rotor including a second rotor body including a second protrusion protruding from an outer circumferential surface thereof, a first rotor body upwardly stacked on and coupled to the second rotor body and including a first protrusion disposed at a position different from a position of the second protrusion with respect to a circumferential direction and protruding from an outer circumferential surface thereof, and a third rotor body downwardly stacked on and coupled to the second rotor body and including a third protrusion disposed at a position different from the position of the first protrusion and the position of the second protrusion with respect to the circumferential direction and protruding from an outer circumferential surface thereof, wherein a height of the first protrusion is formed to be greater than a height of the first rotor body, a height of the second protrusion is formed to be greater than a height of the second rotor body, and a height of the third protrusion is formed to be greater than a height of the third rotor body.

The first protrusion may include a first extension protruding further than a lower surface of the first rotor body, the second protrusion may include a second extension protruding further than an upper surface and a lower surface of the second rotor body, and the third protrusion may include a third extension protruding further than an upper surface of the third rotor body.

The first extension, the second extension, and the third extension may include a slide edge part formed on inner ends thereof.

According to still another aspect of the present invention, there is provided a motor which includes a stator, a rotor including a first rotor body disposed in the stator and including a first protrusion protruding from an outer circumferential surface thereof, a second rotor body downwardly stacked on and coupled the first rotor body and including a second protrusion disposed at a position different from a position of the first protrusion with respect to a circumferential direction and protruding from an outer circumferential surface thereof, and a third rotor body upwardly stacked on and coupled to the first rotor body and including a third protrusion disposed at a position different from the position of the first protrusion and the position of the second protrusion with respect to the circumferential direction and protruding from an outer circumferential surface thereof, wherein a height of the first protrusion is formed to be greater than a height of the first rotor body, a height of the second protrusion is formed to be greater than a height of the second rotor body, and a height of the third protrusion is formed to be greater than a height of the third rotor body, a coil unit wound around each of the first protrusion, the second protrusion, and the third protrusion, and a rotating shaft coupled to the rotor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Purposes, specific advantages, and novel features of the invention should be made clearer from exemplary embodiments and the following detailed descriptions in connection with the accompanying drawings. Terms and words used in this specification and claims are not to be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. In the description of the present invention, when it is determined that related well-known technologies unnecessarily obscure the gist of the present invention, the detailed descriptions thereof will be omitted.

Although the terms "first," "second," etc. may be used herein to describe various elements, these elements are not to be limited by these terms. These terms are only used to distinguish one element from another. For example, a first element could be termed a second element, and similarly, a second element could be termed a first element, without departing from the scope of the present invention. The term "and/or" includes any and all combinations of one or more of the associated listed items.

Figure 1:
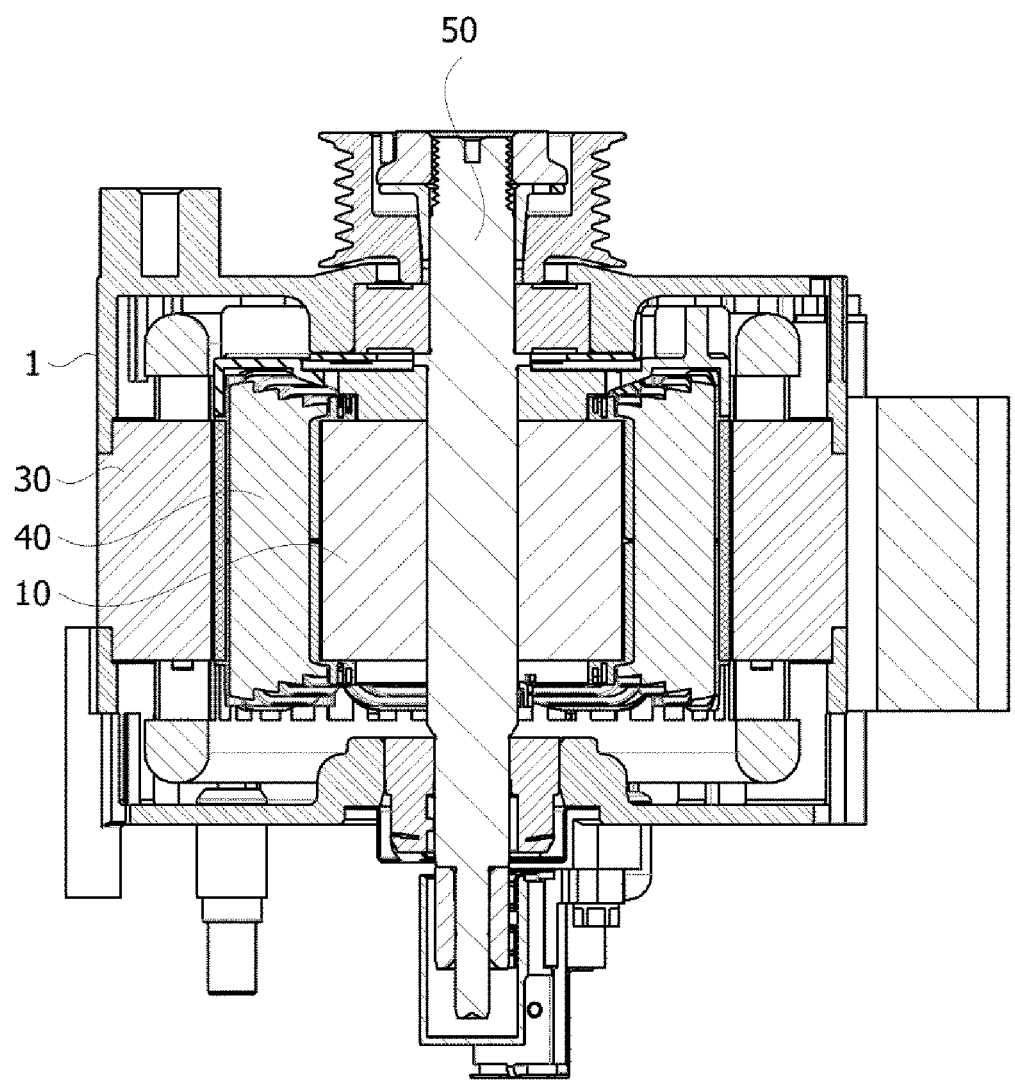
FIG. 1 is a view illustrating a motor according to an exemplarily embodiment of the present invention.

FIG. 1 is a view illustrating a motor according to an exemplary embodiment of the present invention.

Referring to FIG. 1, a motor may include a stator 30 in a housing 1. A rotor 10 is included in the stator 30, and a coil 40 may be wound around the rotor 10. The coil 40 may induce an electrical interaction with the stator 30 to rotate the rotor 10 or induce power by the rotating rotor 10.

Specifically, when the motor operates as a starter motor, the rotor 10 is rotated by an applied driving current to rotate a pulley belt (not shown) connected to a rotating shaft 50 of the rotor 10, and an external component (an engine and the like) may be operated.

Conversely, when the motor operates as an alternator, the pulley belt (not shown) is rotated by an operation of an engine to rotate the rotor 10, and an alternating current (AC) is generated. The generated AC may be supplied to an external component (a battery and the like) by being converted into a direct current (DC).

Figure 2:
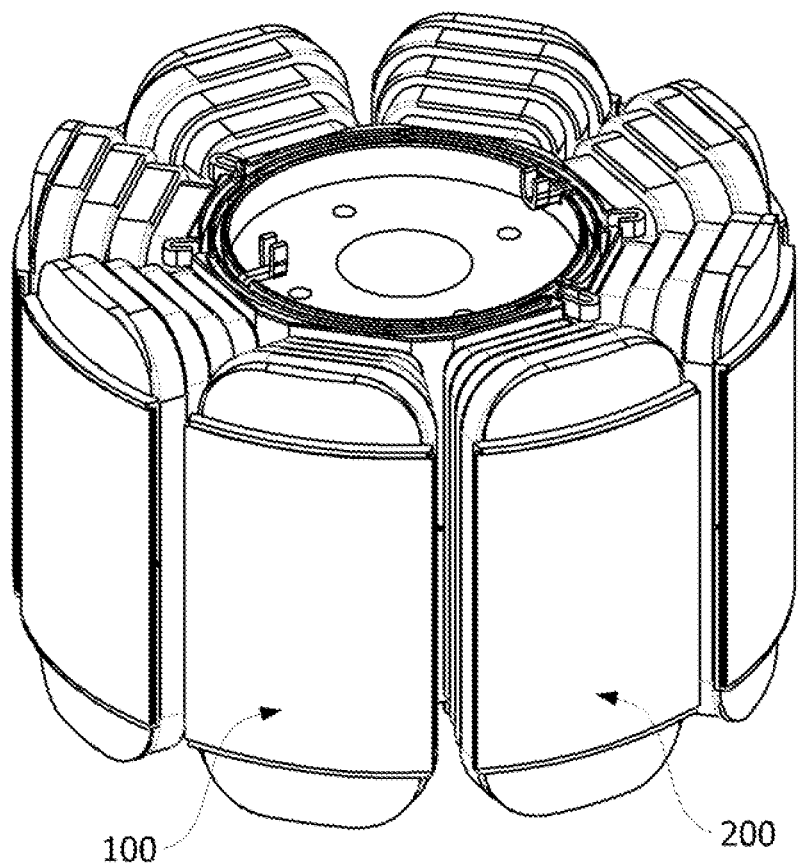
FIG. 2 is a view illustrating a rotor shown in FIG. 1.
Figure 3:
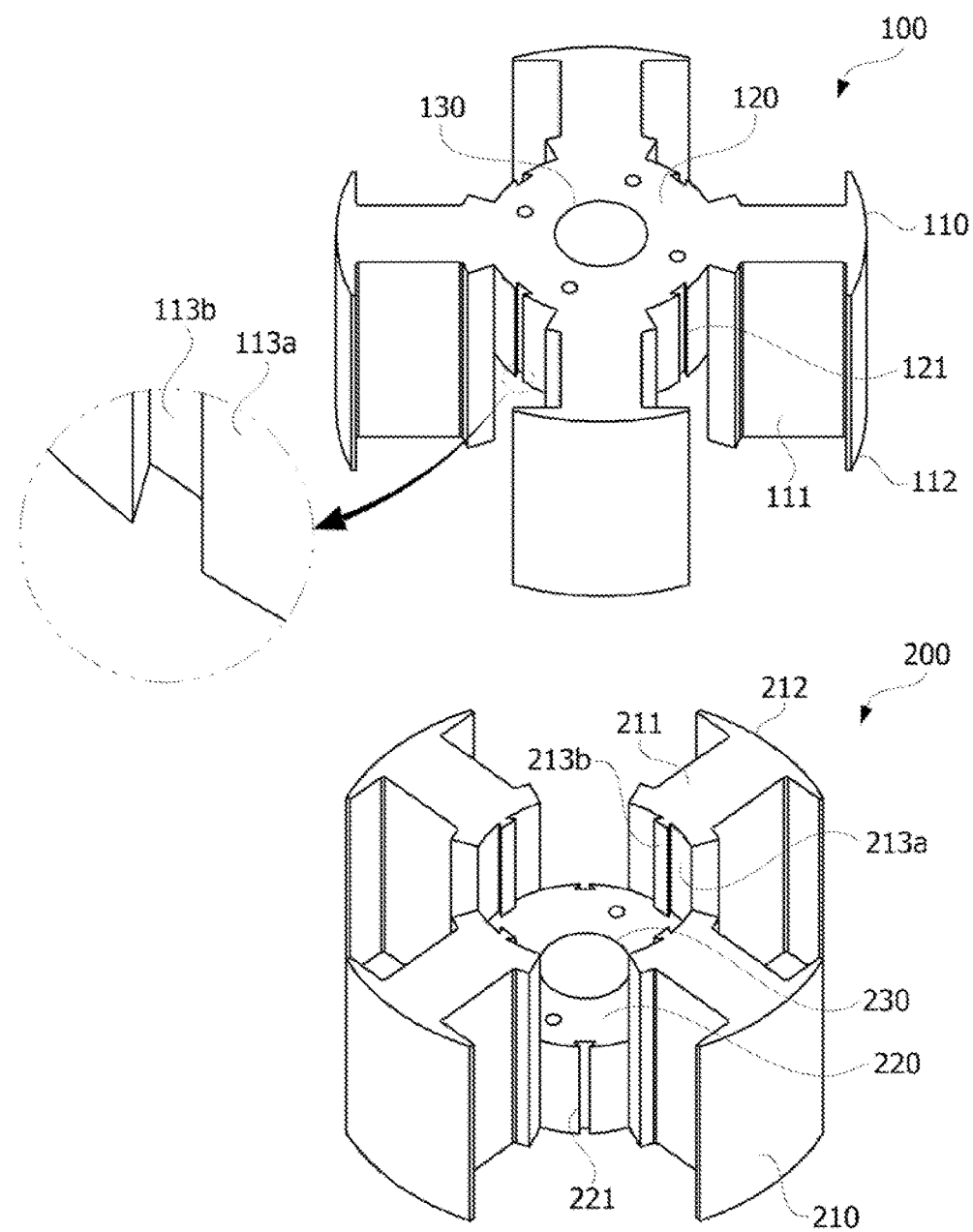
FIG. 3 is a view illustrating a first rotor body and a second rotor body.

FIG. 2 is a view illustrating the rotor shown in FIG. 1, and FIG. 3 is a view illustrating a first rotor body and a second rotor body. FIGS. 2 and 3 clearly illustrate only main characteristic portions for conceptually and clearly understanding the present invention. As a result, various modifications of the illustration are expected, and it is not necessary that the scope of the present invention be limited to specific shapes illustrated in the drawing.

As shown in FIGS. 2 and 3, the rotor 10 according to an exemplary embodiment of the present invention may include a first rotor body 100 and a second rotor body 200. The first rotor body 100 and the second rotor body 200 are elements which form the rotor by being mutually stacked in a height direction. Each of the first rotor body 100 and the second rotor body 200 may be formed by stacking a plurality of plates. In this case, the first rotor body 100 is illustrated as being downwardly coupled to the second rotor body 200.

Referring to FIG. 3, the first rotor body 100 may include first protrusions 110. The first protrusions 110 protrude from an outer circumferential surface of the first rotor body 100 in a radial direction. Coils are wound around the first protrusions 110, and insulators may be installed on the first protrusions 110 for insulation. Here, the first protrusions 110 may be disposed in a circumferential direction of a boss 120 in a cylindrical shape at regular intervals. A hole 130 into which the rotating shaft 50 is inserted may be formed in the center of the boss 120.

The first protrusion 110 may include an arm-type body 111 connected to the boss 120 and a rim-type blocking protrusion 112 formed at a front end of the arm-type body 111. A coil is wound around the arm-type body 111. As shown in FIG. 3, all four of the first protrusions 110 may be disposed at regular intervals. The number of the first protrusions 110 may vary depending on the number of poles of the motor.

The second rotor body 200 may include second protrusions 210. The second protrusions 210 protrude from an outer circumferential surface of the second rotor body 200 in a radial direction. Coils are wound around the second protrusions 210, and insulators may also be installed on the second protrusions 210 for insulation. Further, the second protrusions 210 may be disposed in a circumferential direction of a boss 220 in a cylindrical shape at regular intervals. A hole 230 into which the rotating shaft 50 is inserted may be formed in the center of the boss 220.

The second protrusions 210 have the same shape as the shape of the first protrusion 110. The second protrusion 210 may include an arm-type body 211 connected to the boss 220 and a rim-type blocking protrusion 212 formed at a front end of the arm-type body 211. As shown in FIG. 3, all four of the second protrusions 210 may be disposed at regular intervals. The number of the second protrusions 210 may vary depending on the number of poles of the motor.

The first rotor body 100 and the second rotor body 200 are disposed so that the first rotor body 100 is disposed at a higher level than the second rotor body 200 and the second rotor body 200 is disposed at a lower level than the first rotor body 100 with respect to an axial center, and thus the respective protrusions 110 and 210 may be stacked and coupled to each other in a complementary state.

Figure 4:
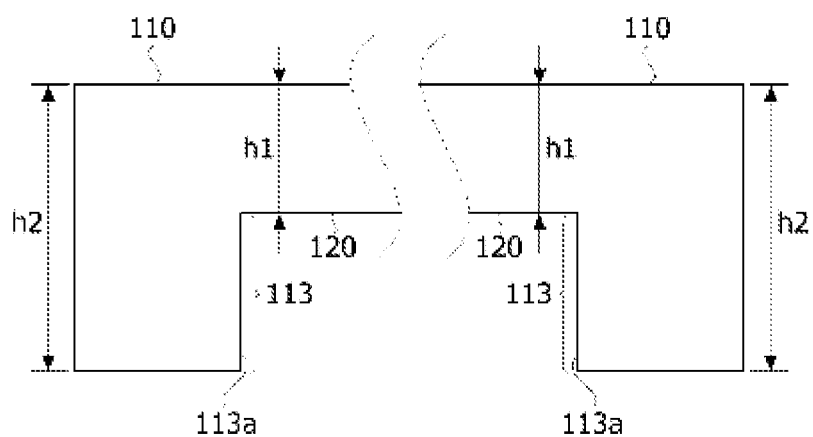
FIG. 4 is a view illustrating a first extension.
Figure 5:
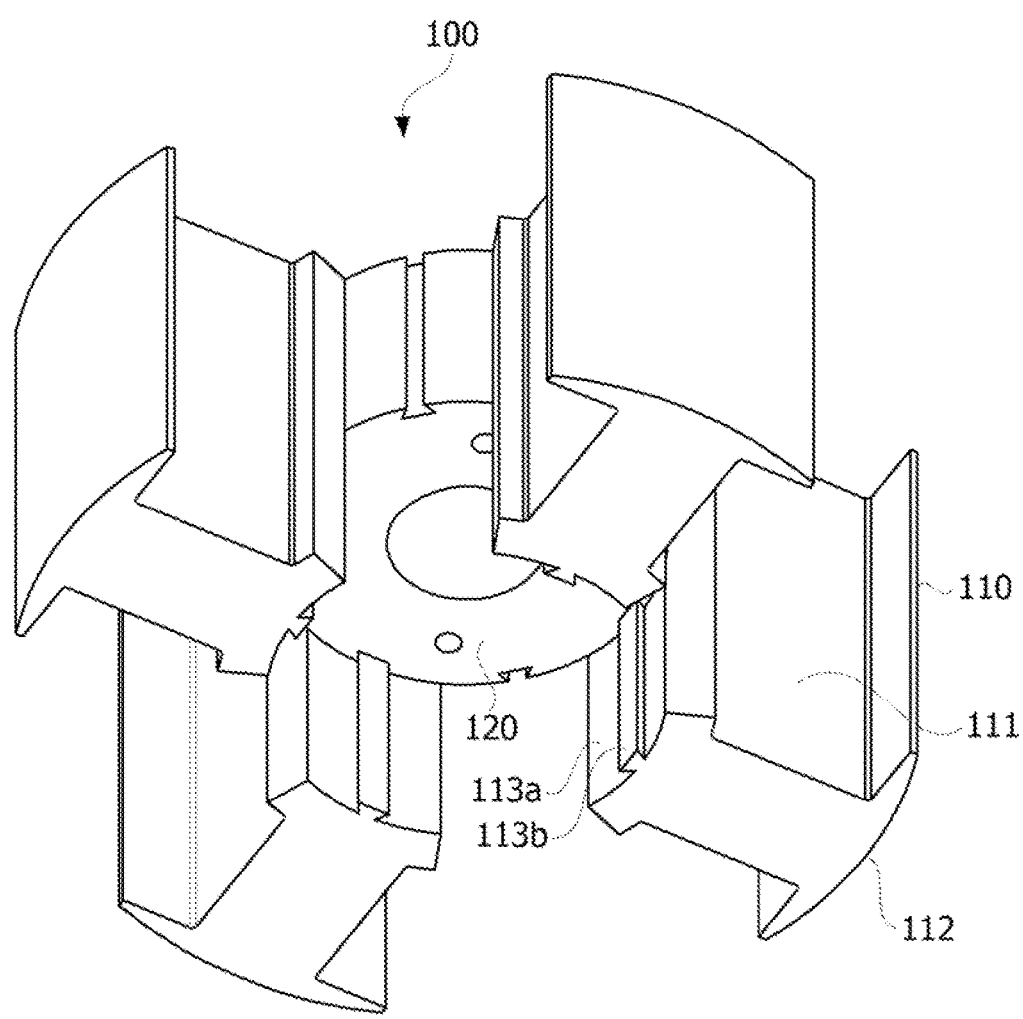
FIG. 5 is a bottom view of the first extension.

FIG. 4 is a view illustrating a first extension, and FIG. 5 is a view illustrating the bottom of the first extension.

Referring to FIGS. 4 and 5, a height h2 of the first protrusion 110 is formed to be greater than a height h1 of the cylindrical boss 120, that is, a height of a body of the first rotor body 100. In this case, the height is based on an axial direction of the motor. For example, the first protrusion 110 may include a first extension 113 protruding further downward than the boss 120. The first extension 113 is a portion from which the first protrusion 110 extends and to which the boss 220 of the second protrusion 210 is coupled.

Referring to FIGS. 3 to 5, the first extension 113 may include a slide edge part 113a having a curved inner circumferential surface aligned with an outer circumferential surface of the cylindrical boss 220 of the second rotor body 200. The inner circumferential surface of the slide edge part 113a slidably comes in contact with the outer circumferential surface of the boss 220 of the second protrusion 210.

Meanwhile, a slide protrusion 113b may be formed from the inner circumferential surface of the slide edge part 113a in an axial direction. The slide protrusion 113b is inserted into a slide groove 221 formed in the cylindrical boss 220 of the second rotor body 200 to allow the first rotor body 100 and the second rotor body 200 to be coupled to each other.

A slide groove 121 may be formed in an outer circumferential surface of the boss 120 of the first extension 113 in the axial direction.

Figure 6:
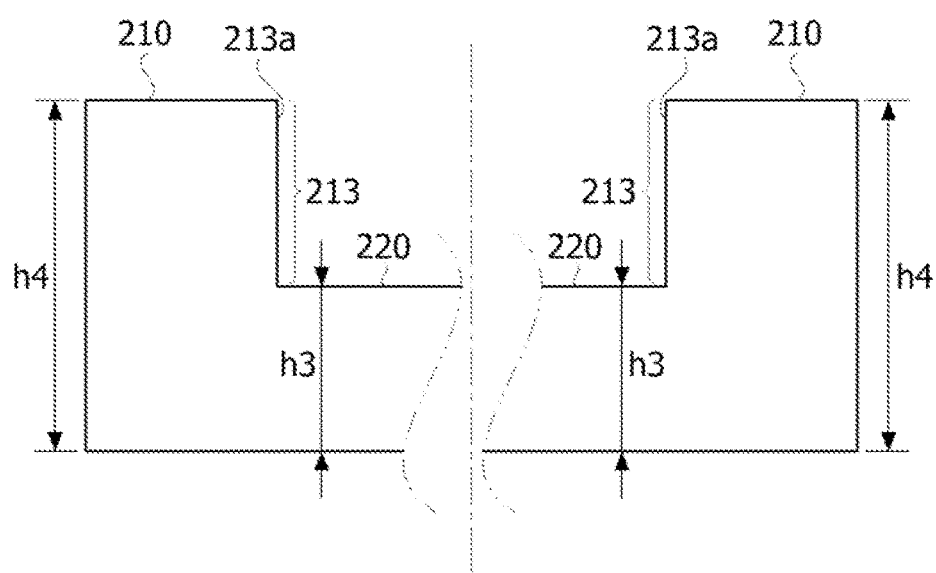
FIG. 6 is a view illustrating a second extension.

FIG. 6 is a view illustrating the second extension.

Referring to FIG. 6, a height h4 of the second protrusion 210 is formed to be greater than a height h3 of the cylindrical boss 220, that is, the height of a body of the second rotor body 200. For example, the second protrusion 210 may include a second extension 213 protruding further upward than the boss 220. The second extension 213 is a portion from which the second protrusion 210 extends and to which the boss 120 of the first protrusion 110 is coupled.

Referring to FIGS. 3 and 6, the second extension 213 may include a slide edge part 213a having a curved inner circumferential surface aligned with the outer circumferential surface of the cylindrical boss 120 of the first rotor body 100. The inner circumferential surface of the slide edge part 213a slidably comes in contact with the outer circumferential surface of the boss 120 of the first protrusion 110.

Meanwhile, a slide protrusion 213b may be formed from the inner circumferential surface of the slide edge part 213a in an axial direction. The slide protrusion 213b is inserted into the slide groove 121 formed in the cylindrical boss 120 of the first rotor body 100 to allow the first rotor body 100 and the second rotor body 200 to be coupled to each other.

The slide groove 221 may be formed in the outer circumferential surface of the boss 220 of the second extension 213 in the axial direction.

Figure 7:
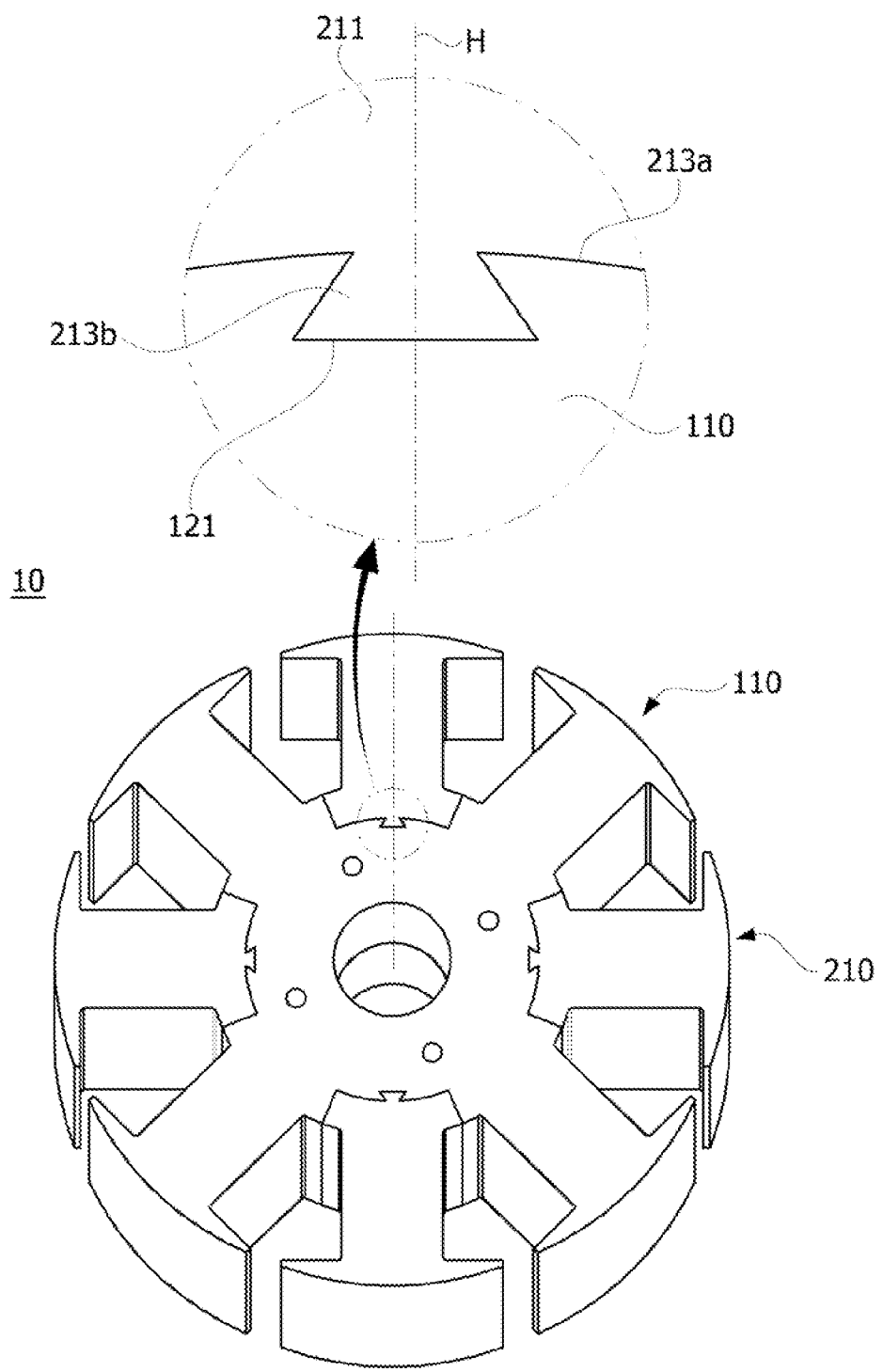
FIG. 7 is a view illustrating a rotor in which the first rotor body and the second rotor body are coupled to each other.

FIG. 7 is a view illustrating the rotor in which the first rotor body and the second rotor body are coupled to each other.

Referring to FIGS. 3 and 7, the first rotor body 100 and the second rotor body 200 are coupled to form the rotor 10 so that the first protrusions 110 and the second protrusions 210 are alternately disposed with respect to a circumferential direction. To this end, the first protrusions 110 and the second protrusions 210 may be alternately disposed in the circumferential direction when the first rotor body 100 and the second rotor body 200 are coupled to each other.

As shown in FIG. 7, the slide protrusion 213b of the second protrusion 210 may be formed to correspond to a reference line H passing through the center of a width direction of the slide edge part 213a in the radial direction. The slide protrusion 113b of the first protrusion 110 may be also formed to correspond to a reference line passing through the center of a width direction of the slide edge part 113a in the radial direction.

The slide protrusion 213b is formed so that a width thereof is reduced from a tip end portion to a root portion, and may be formed so that a mutual binding force is generated between the first rotor body 100 and the second rotor body 200 with respect to the radial direction.

Figure 8:
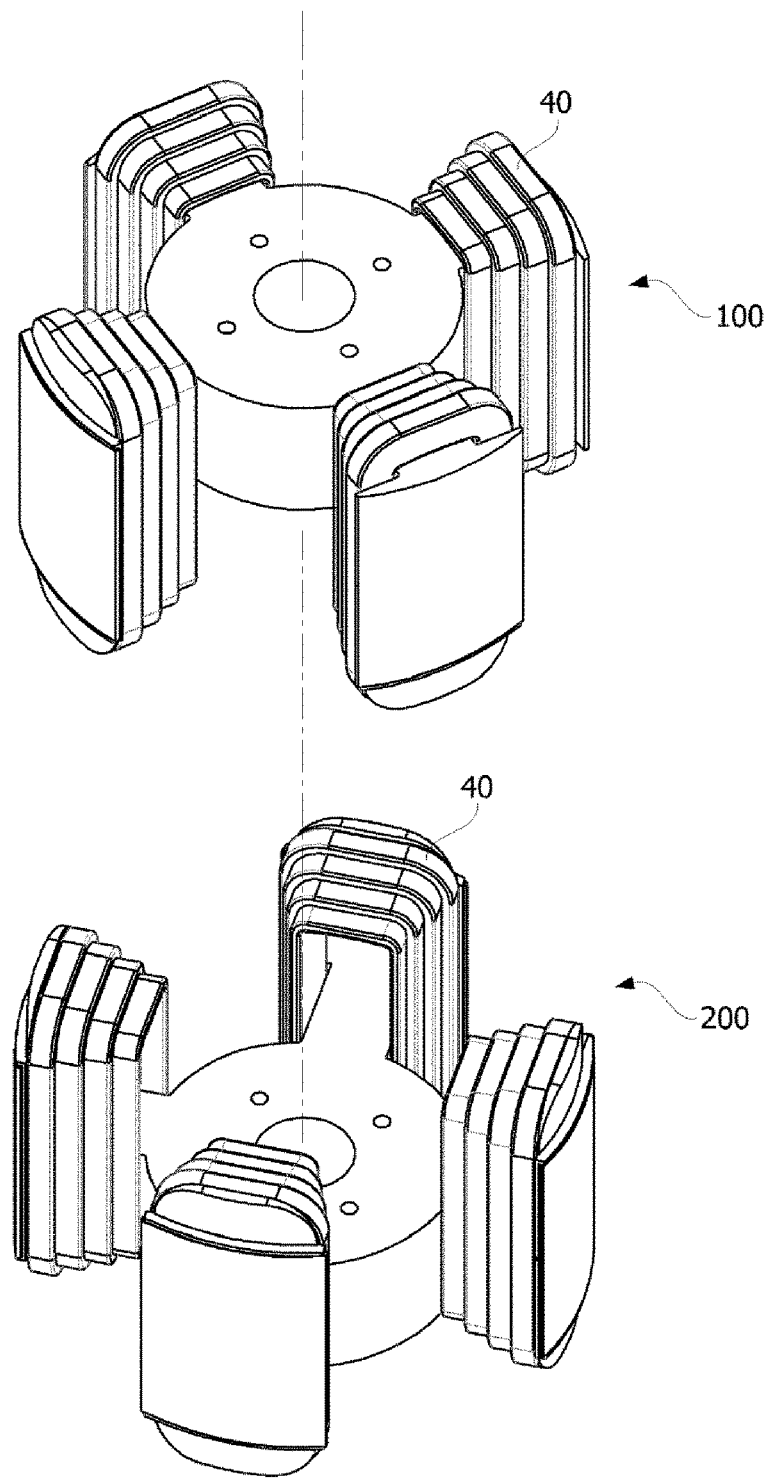
FIG. 8 is a view illustrating a state in which a coil is wound around each of the first rotor body and the second rotor body.

FIG. 8 is a view illustrating a state in which coils are wound around each of the first rotor body and the second rotor body.

As shown in FIG. 8, coils 40 are wound around each of the first rotor body 100 and the second rotor body 200 and then coupled to each other. Because gaps between the protrusions around which the coils are wound are wide in comparison to having a single rotor body, a coil space factor may be remarkably increased. Also, a task of winding the coils may be more easily performed.

Figure 9:
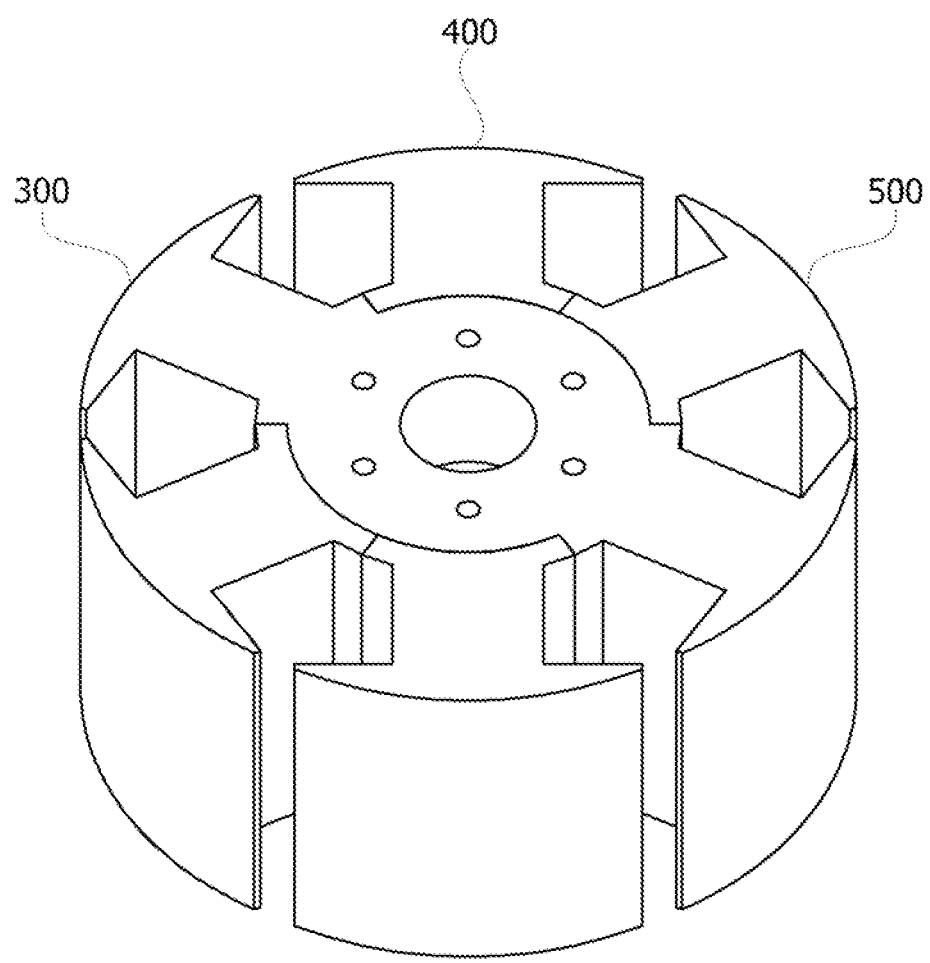
FIG. 9 is a view illustrating a rotor according to another embodiment.
Figure 10:
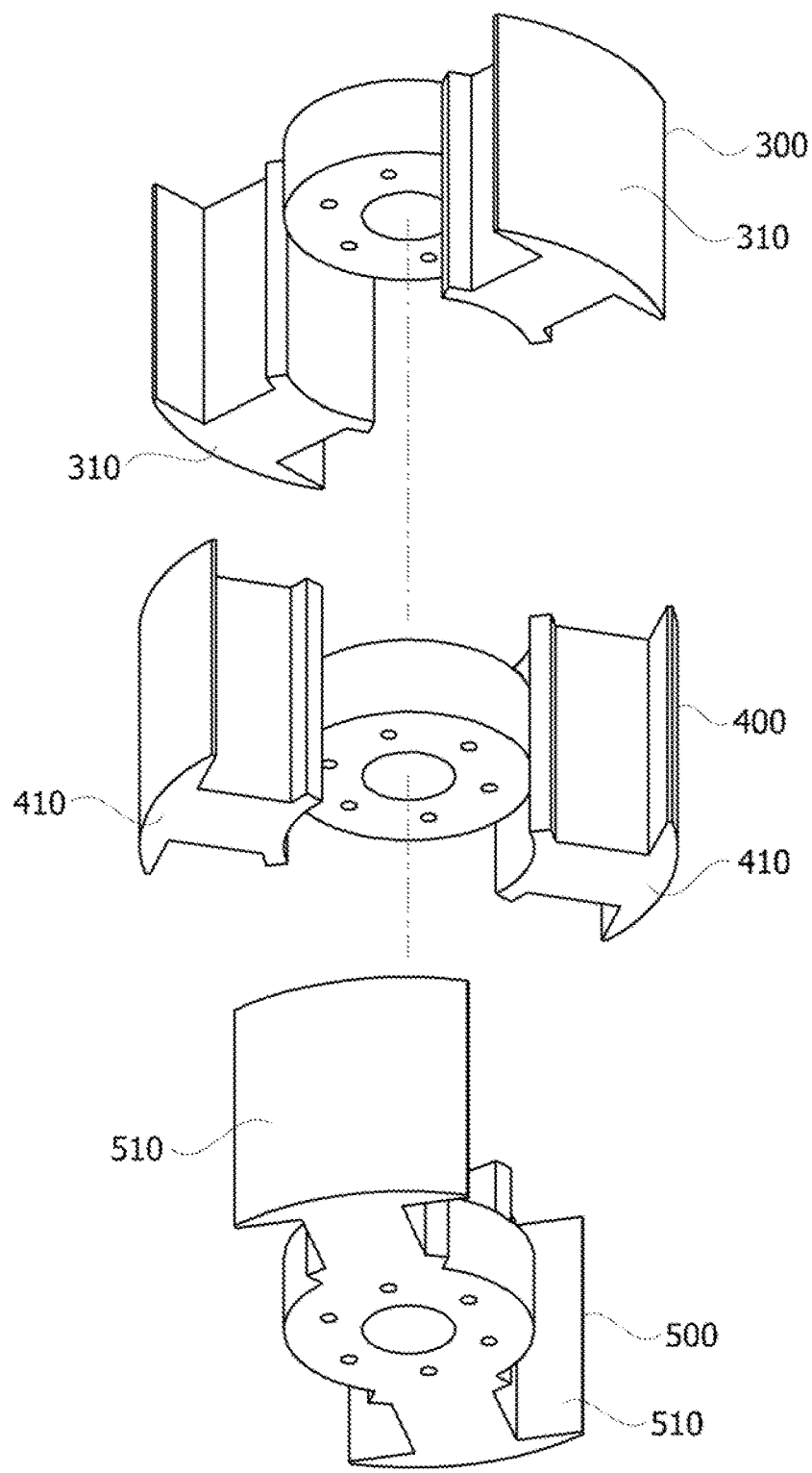
FIG. 10 is an exploded view of the rotor shown in FIG. 9.

FIG. 9 is a view illustrating a rotor according to another embodiment, and FIG. 10 is an exploded view of the rotor shown in FIG. 9.

Referring to FIGS. 9 and 10, a rotor 10 according to another embodiment may include three rotor bodies 300, 400, and 500.

Two protrusions 310, two protrusions 410, and two protrusions 510 may be formed at the rotor bodies 300, 400, and 500, respectively. The three rotor bodies 300, 400, and 500 may be stacked and coupled to each other to have the same axis so that the respective protrusions 310, 410 and 510 are alternately disposed with respect to a circumferential direction. The respective protrusions 310, 410 and 510, which have the same functions and structures as those of the above-described protrusions 110 and 210, are portions around which coils are wound.

Figure 11:
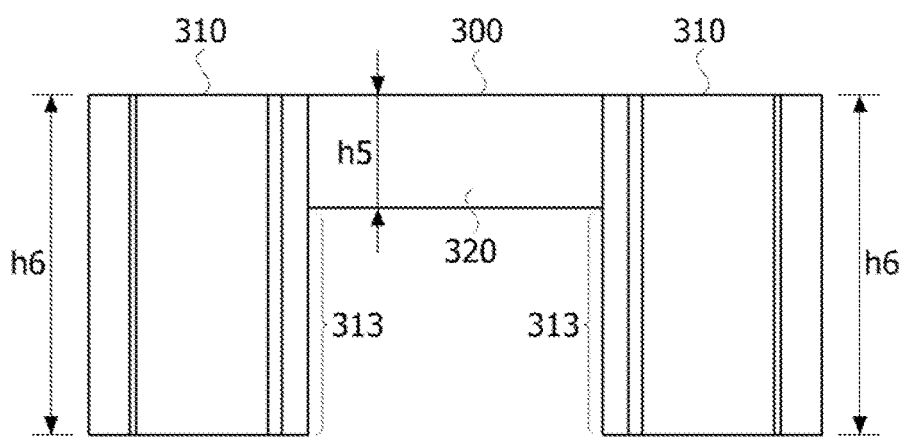
FIG. 11 is view illustrating a first rotor body of the rotor shown in FIG. 9.
Figure 12:
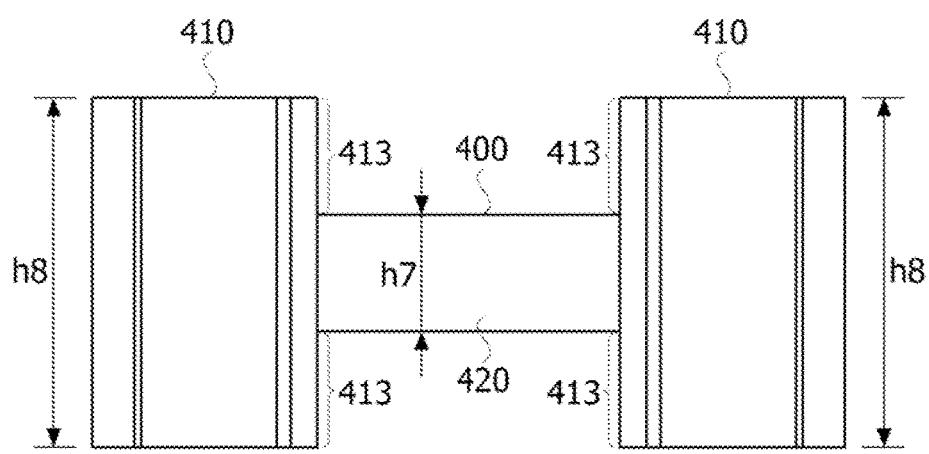
FIG. 12 is a view illustrating a second rotor body of the rotor shown in FIG. 9.
Figure 13:
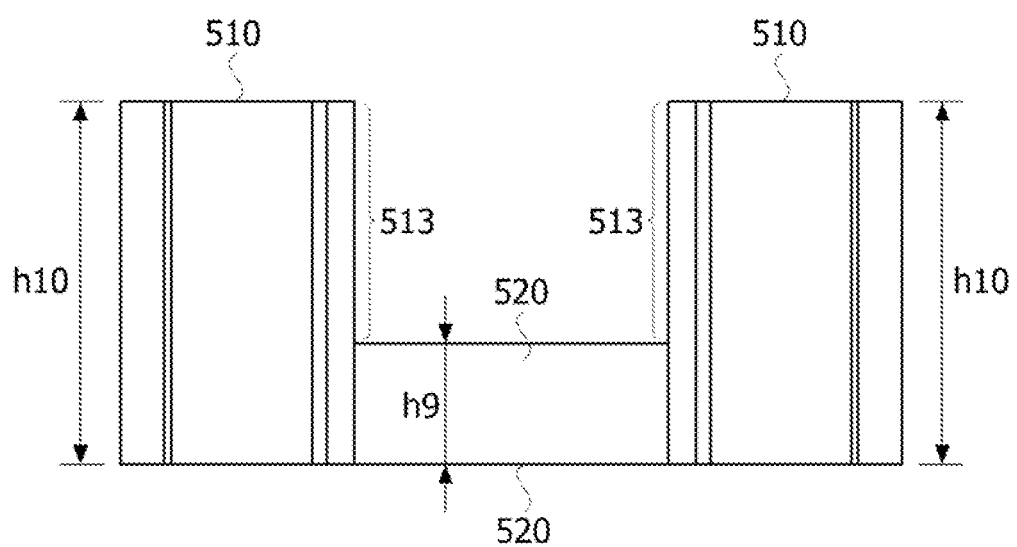
FIG. 13 is a view illustrating a third rotor body of the rotor shown in FIG. 9.

FIG. 11 is a view illustrating a first rotor body of the rotor shown in FIG. 9, FIG. 12 is a view illustrating a second rotor body of the rotor shown in FIG. 9, and FIG. 13 is a view illustrating a third rotor body of the rotor shown in FIG. 9.

Referring to FIGS. 9 to 11, a first rotor body 300 refers to a rotor body disposed as the top of the three rotor bodies. A height h6 of the first protrusion 310 of the first rotor body 300 is formed to be greater than a height h5 of a boss 320. Specifically, the first protrusion 310 may be downwardly long so that a first extension 313 may come in contact with an outer circumferential surface of a boss 420 of the second rotor body 400 and an outer circumferential surface of a boss 520 of the third rotor body 500, which are disposed under the first rotor body 300. For example, the height h6 of the first protrusion 310 may be formed to correspond to the entire height of the rotor 10.

Referring to FIG. 12, the second rotor body 400 refers to a rotor body disposed in the middle of the three rotor bodies. A height h8 of the second protrusion 410 of the second rotor body 400 is formed to be greater than a height h7 of the boss 420. Specifically, the second protrusion 410 may be downwardly and upwardly long so that a second extension 413 may come in contact with an outer circumferential surface of the boss 320 of the first rotor body 300 in an upward direction and come contact with the outer circumferential surface of the boss 520 of the third rotor body 500 in a downward direction. For example, the height h8 of the protrusion 410 may be formed to correspond to the entire height of the rotor 10.

Referring to FIG. 13, the third rotor body 500 refers to a rotor body disposed as the bottom of the three rotor bodies. A height h10 of the third protrusion 510 of the third rotor body 500 is formed to be greater than a height h9 of the boss 520. Specifically, the third protrusion 510 may be upwardly long so that a third extension 513 may come in contact with the outer circumferential surface of the boss 420 of the second rotor body 400 and come contact with the outer circumferential surface of the boss 320 of the first rotor body 300, which are disposed above the third rotor body 500. For example, the height h10 of the third protrusion 510 may be formed to correspond to the entire height of the rotor 10.

The respective heights h5, h7 and h9 of the bosses 320, 420 and 520 of the rotor bodies 300, 400 and 500 may be formed to be the same.

According to the embodiment, a plurality of rotor bodies are stacked up to form a rotor, the rotor bodies include protrusions wound which coils are wound, respectively, and the protrusions of the rotor bodies are alternately disposed with respect to a circumferential direction so that the protrusions that are divided constitute the whole protrusion. Therefore, the rotor is formed so that the coils are wound around the respective protrusions that are divided and have relatively wide winding spaces unlike a rotor integrated with protrusions around which coils are wound, thereby increasing a coil space factor and providing an effect of facilitating a winding task.

The rotor according to a single exemplary embodiment of the present invention and the motor having the same have been described above in detail with reference to the accompanying drawings.

The above description is only an example describing the technological scope of the present invention. Various changes, modifications, and replacements may be made by those skilled in the field of the present technology without departing from the spirit and scope of the present invention. Therefore, the embodiments and the accompanying drawings disclosed above should be considered in a descriptive sense only and not for limiting the technological scope. The technological scope of the present invention is not limited by these embodiments and the accompanying drawings. The spirit and scope of the present invention should be interpreted by the appended claims and encompass all equivalents falling within the scope of the appended claims.

DESCRIPTION OF SYMBOL

10: ROTOR
50: ROTATING SHAFT
100, 300: FIRST ROTOR BODY
110, 310: FIRST PROTRUSION
111, 211: ARM-TYPE BODY
112, 212: BLOCKING PROTRUSION
113, 313: FIRST EXTENSION
113a, 213a: SLIDE EDGE PART
113b: SLIDE PROTRUSION
120, 220, 320, 420, 520: BOSS
121, 221: SLIDE GROOVE
200, 400: SECOND ROTOR BODY
210, 410: SECOND PROTRUSION
213, 413: SECOND EXTENSION
500: THIRD ROTOR BODY
510: THIRD PROTRUSION
513: THIRD EXTENSION

What is claimed is:

1. A rotor comprising:
  a first rotor body including a first protrusion protruding in a radial direction from an outer circumferential surface of the first rotor body; and
  a second rotor body stacked on and coupled to the first rotor body and including a second protrusion disposed at a position different from a position of the first protrusion with respect to a circumferential direction, the second protrusion protruding in the radial direction from an outer circumferential surface of the second rotor body,
  wherein a height of the first protrusion in an axial direction is formed to be greater than a height of the first rotor body in the axial direction and a height of the second protrusion in the axial direction is formed to be greater than a height of the second rotor body in the axial direction,
  wherein the first protrusion includes a first extension protruding further in the axial direction than a lower surface of the first rotor body,
  wherein the second protrusion includes a second extension protruding further than an upper surface of the second rotor body,
  wherein the first extension of the first protrusion comprises a first slide protrusion extending in the radial direction, wherein the second extension of the second protrusion comprises a second slide protrusion extending in the radial direction, wherein the first extension and the second extension include a first slide edge part and a second slide edge part, respectively, the first and second slide edge parts being formed at inner ends of the first and second extensions, respectively;

wherein the first and second slide edge parts include first and second slide protrusions, respectively, the first and second slide protrusions each protruding in the radial direction and being formed with a height in the axial direction;

wherein the first rotor body and the second rotor body respectively include first and second slide grooves concavely formed in the radial direction on the outer circumferential surfaces of the corresponding rotor body and formed with a height in the axial direction, and wherein widths of each of the first and second slide protrusions decrease from an inner side toward an outer side, and widths of each of the first and second slide grooves increase from an inner side toward an outer side.

2. The rotor of claim 1, wherein the first slide edge part of the first extension has a curved inner circumferential surface aligned with an outer circumferential surface of a second cylindrical boss of the second rotor body, wherein the second slide edge part of the second extension has a curved inner circumferential surface aligned with an outer circumferential surface of a first cylindrical boss of the first rotor body.

3. The rotor of claim 1, wherein each of the first protrusion and the second protrusion includes an arm-type body connected to the first and second bosses, respectively, and a rim-type blocking protrusion being formed at a front end of the arm-type body.

4. A motor comprising:
a stator;
a rotor according to claim 3; and
a rotating shaft coupled to the rotor.

5. The rotor of claim 2,
wherein the first and second curved inner circumferential surfaces of the first and second slide edge parts slidably come in contact with the outer circumferential surfaces of the first and second bosses, respectively.

6. A motor comprising:
a stator;
a rotor according to claim 5; and
a rotating shaft coupled to the rotor.

7. A motor comprising:
a stator;
a rotor according to claim 2; and
a rotating shaft coupled to the rotor.

8. The rotor of claim 1, wherein the first and second slide protrusions are disposed at centers of the first and second slide edge parts, respectively, with respect to the circumferential direction.

9. A motor comprising:
a stator;
a rotor according to claim 8; and
a rotating shaft coupled to the rotor.

10. A motor comprising:
a stator;
a rotor according to claim 1; and
a rotating shaft coupled to the rotor.

* * * * *